Figure 4:
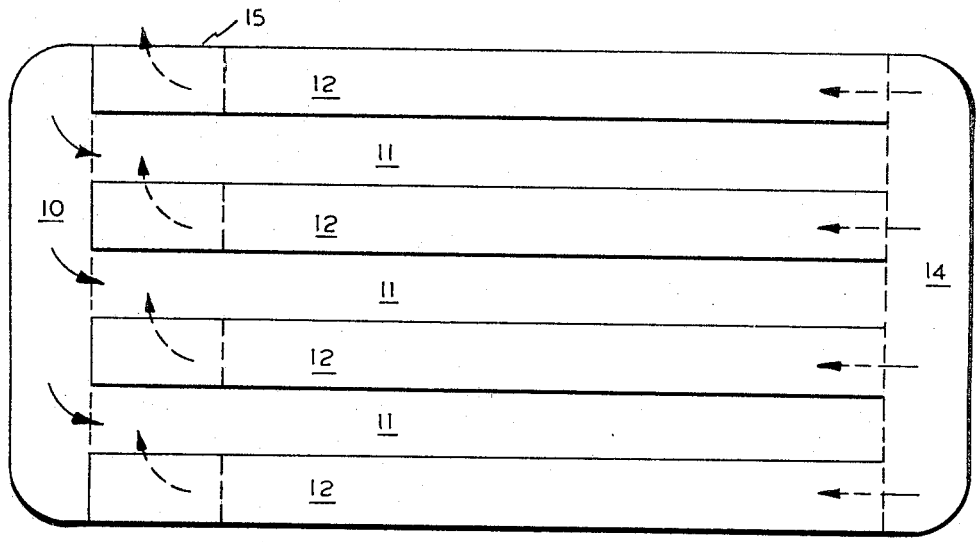

Jan. 3, 1967 D. S. HENDERSON ETAL 3,295,919
METHOD OF TREATING EXHAUST GASES OF INTERNAL COMBUSTION ENGINES
Filed Sept. 6, 1962 2 Sheets-Sheet 1
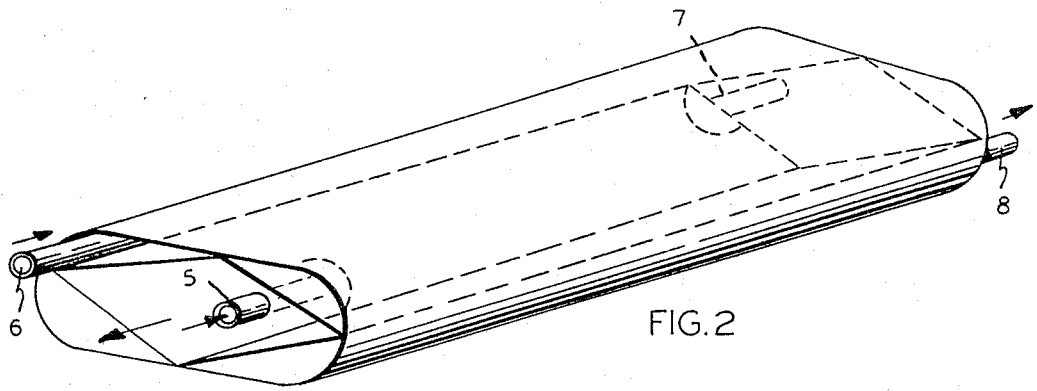
FIG. 2
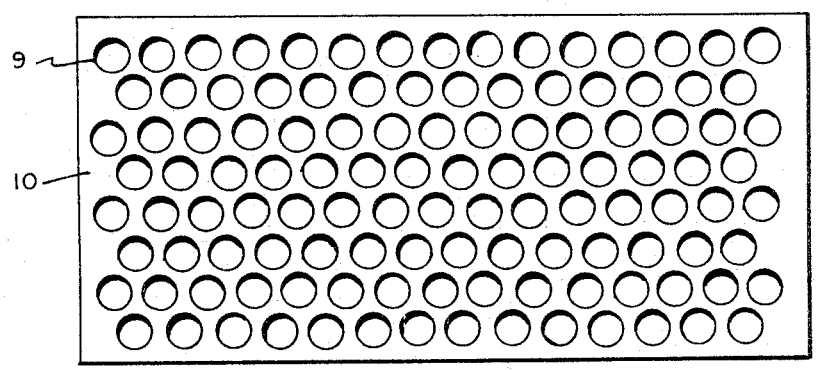
FIG. 3
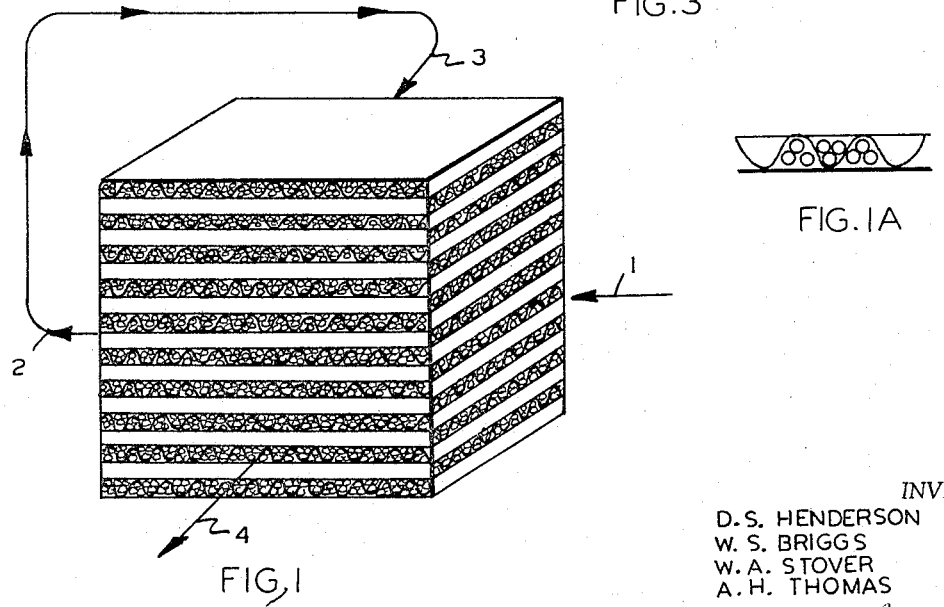
FIG. 1A
FIG. 1
INVENTORS
D. S. HENDERSON
W. S. BRIGGS
W. A. STOVER
A. H. THOMAS
BY
Joseph P. Hagan
ATTORNEY Jan. 3, 1967  D. S. HENDERSON ET AL  3,295,919
METHOD OF TREATING EXHAUST GASES OF INTERNAL COMBUSTION ENGINES
Filed Sept. 6, 1962  2 Sheets-Sheet 2

INVENTORS
D.S. HENDERSON
W.S. BRIGGS
W.A. STOVER
A.H. THOMAS

BY

ATTORNEY

United States Patent Office 3,295,919
Patented Jan. 3, 1967

3,295,919
METHOD OF TREATING EXHAUST GASES OF INTERNAL COMBUSTION ENGINES
Donald S. Henderson, Baltimore, Warren S. Briggs, Silver Spring, and William A. Stover and Alan H. Thomas, Ellicott City, Md., assignors to W. R. Grace & Co., Clarksville, Md., a corporation of Connecticut
Filed Sept. 6, 1962, Ser. No. 221,797
4 Claims. (Cl. 23—2)

This invention relates to a method of treating exhaust gases containing unburned and incompletely burned hydrocarbons, to a catalytic system useful in such a method, and to a method of controlling the temperature in the catalytic system.

One particular aspect of the invention relates to the method of controlling the temperature in a catalytic converter useful for converting the noxious components in auto exhaust gases to innocuous entities.

The problem of air pollution is not a new one. However, the problem has become aggravated in many cities in recent years. The exhaust gases from internal combustion engines, and particularly from automobile engines, contains some unburned hydrocarbons which accumulate in the atmosphere. In the presence of sunlight, photolysis of the oxides of nitrogen leads to the formation of measurable quantities of ozone. The ozone, in turn, reacts with the various organic pollutants to form compounds which can cause the many undesirable manifestations of smog, such as eye irritation, visibility reduction and plant damage. The smog condition is also harmful to agricultural production, and appears to be a substantial human health hazard.

Exhaust gases also include carbon monoxide, which although not appearing to be a smog producing agent, is a poisonous gas, and as such constitutes a health hazard. This, too, is derived mainly from auto exhaust emissions.

Almost since the advent of the automobile attempts have been made to render harmless and unobjectionable the noxious fumes which are the by-products of internal combustion engines and similar devices. The earliest devices were filters using elementary catalytic materials, and from the 1920's on, various modifications of filters and mufflers have been produced, but to date none have met with success complete enough for practical application.

Several investigators have realized that the only practical way to treat exhaust fumes to reduce hydrocarbon and carbon monoxide pollution is to oxidize the hydrocarbons to carbon dioxide and water and to oxidize the carbon monoxide to carbon dioxide.

A wide selection of oxidation catalysts has been produced in the past varying in both chemical composition and physical structure. With respect to chemical composition, the ability of a wide variety of metals and metal oxides, either alone or in combination, to catalyze the complete oxidation of hydrocarbons has been noted.

To be sufficiently efficient in the removal of hydrocarbons and carbon monoxide from auto exhaust gases, and to meet the standards of maximum emission currently under consideration in the legislatures of the various states, the catalyst for treating the exhaust gas must become efficient within a very few minutes after engine start-up and must maintain its activity throughout the various modes of engine operation. The catalytic converter must maintain its catalytic activity for a period of not less than one year and preferably for two years or 20,000 miles of engine operation.

The problem of excessively high temperatures which are obtained when a high concentration of pollutants are being oxidized must also be solved in the system. It is not unusual for catalyst temperatures to reach 1600° F. or higher. The normal catalytic system cannot withstand prolonged exposure to these temperatures without thermal degradation of the catalyst.

We have discovered a method of avoiding these temperatures while converting the noxious entities in the exhausts of internal combustion engines which consists of a novel arrangement of alternate layers of a lead adsorbent bed or catalyst bed, with a second catalyst bed, such that the heat transfer from one bed to the other will be maximum but such that there can be no direct gas flow from one bed to the other. This is accomplished by incorporating metal spacers between each of the beds so that the maximum distance from any catalyst or lead adsorbent pellet to a metal heat transfer surface will be relatively small, on the order of a few millimeters.

The flow of the exhaust gas from the engine to the catalytic muffler in the process of our invention is as follows:

The gases leave the engine and pass through the first bed which may be filled with a lead adsorbent or a catalyst. The gases exit from the first bed into a cooling area such as an external cooling tube and then re-enter into the second catalyst bed of the muffler at substantially lower temperatures than the bed itself, which has been pre-heated by the inlet gas from the first bed by heat transfer.

Any suitable catalyst can be used in the process of our invention. The catalyst can be on any suitable support, such as silica-alumina, alumina, silica-magnesia, etc. Suitable catalysts include platinum on silica-alumina, platinum-palladium on silica-alumina, palladium promoted copper-oxide on alumina, etc.

The gases pass through the system at a gaseous hourly space velocity of 3,000 to 50,000 volumes of gas per volume of catalyst per hour.

The operation of the process of our invention is shown in FIGURE 1. A device suitable for the process of our invention consists essentially of a stack of shallow boxes open on two opposite sides only. The boxes are arranged so that the flow in a particular box is at right angles to the flow in the boxes directly adjacent on either side. In addition, each of the boxes may have a corrugated piece of metal inserted into it in such a way that the troughs of the corrugation are parallel to the direction of gas flow.

In operation, the gases enter the first bed of catalytic material (or lead adsorbent) at 1 and are removed at 2. They are then passed through an external cooling device and re-enter the catalyst bed at 3. The gases exit the catalyst system at 4 and are collected and passed to the atmosphere.

FIGURE 1A shows the advantage of the corrugated waves. These waves may provide additional heat transfer surface and make it possible for each catalyst pellet to be closer to such a surface. The waves, if used with pellets of proper size, can restrict the degree of packing of the pellets. As such, they can create the formation of a rigid bed which is somewhat more loosely packed than a corresponding tightly packed bed. This feature permits a control of reactor pressure drop without permitting direct by-passing of the gases.

In the process of our invention, the exhaust gases from the engine enter the lead adsorbent bed (or the first catalytic bed). Sensible heat from the gases is taken up by the lead adsorbent and transferred to the catalyst. Warm-up of the catalyst bed occurs at nearly the same rate as the lead adsorbent bed. Transfer of the sensible heat from the inlet gas stream to the catalyst bed in this manner, prior to the actual contact of the gases with the catalyst, obviates the need to keep the gases hot beyond this point in the flow sequence.

Since the second catalyst bed, which is to be relied on for a conversion of the hydrocarbons to carbon dioxide and water and the carbon monoxide to carbon dioxide, is heated by the sensible heat frm the first bed, it is both possible and desirable to remove heat from the gases before re-entry to this catalytic conversion bed. This is accomplished by passing the gases emerging from the lead adsorbent or first catalytic bed to a cooling chamber such as an external pipe exposed to the atmosphere, for example.

Actually, the invention encompasses a high degree of flexibility in the manner in which this may be done. The amount of cooling which is desirable also would depend, of course, on the various type of catalyst systems being used. At the extreme of minimum cooling, for example, the gases could be passed from the lead adsorbent bed to the catalytic bed without going outside of the converter. This modification would retain essentially all of the heat in the catalyst system.

Another possible method would involve cooling only with a connecting pipe between the two beds. If necessary, or desirable, addition of fins to the cooling pipe would increase the losses by convection or radiation. If the system were one where a large amount of cooling would be desired, it would be possible to pass these gases from the first bed of the system through a water-cooled heat exchange system before re-entry into the catalytic conversion side of the system.

One of the principal advantages of the method of our invention is the automatic control of the temperature which occurs. During warm-up of an auto exhaust system, for example, heat will flow to the catalyst. After warm-up (that is, as soon as any particular part of the catalyst bed reaches the temperature of the inlet gas) heat flow to the catalyst ceases. As soon as the catalyst temperature exceeds that of the adjacent lead adsorbent (or first catalyst bed) the heat transfer characteristic of the reactor will tend to cool the catalyst. To the extent that heat is transferred back into the inlet gas stream, it will be dissipated from the reactor into the external cooling system, if one is being used in the system. It is also significant to realize that this type of temperature control will function individually at each bed location, completely independent of the warm-up or heat removal requirements at some other part of the bed. The effect will be toward equalization of bed temperatures at all parts of the reactor.

This feature is very important, particularly in auto exhaust conversion systems where there is no control of inlet gas temperature or composition.

The degree of heat transfer is inversely proportional to spacing of the heat exchange surfaces. The spacing between the heat exchange surfaces should be from ¼ inch to ¾ inch for normal operation, preferably about ½ to ⅝ inch.

Where corrugations are present, the distance from apex to apex of the corrugations is dependent on spacing between heat exchange surfaces. For example, in a ¼ inch spacing, a distance from apex to apex in the corrugations of ⁵⁄₁₆ inch gives satisfactory results. When the spacing is increased to ½ inch, the apex to apex distance is increased to about ⅝ inch.

The spacing between the heat exchange surface should be equal to the apex to apex distance for maximum heat transfer. Where less heat transfer is required, this ratio can be extended until the apex to apex distance is equal to twice the distance of the heat exchange surfaces. These variations in spacing and apex to apex distance relationship allow flexibility in catalyst particle size selection based on heat exchange requirements.

Another important feature of the process of our invention is that since the beds contain a metallic heat conductor distributed throughout the beds, this conductor will tend to equalize the temperature on the basis of conduction alone. The net effect of these control features results in a substantial lowering of the peak temperature.

FIG. 2 shows one possible method of adapting the process to a conventional muffler to control temperature in a catalytic muffler for an auto exhaust system. In this system, the flow to the catalyst of the auto exhaust is shown at 5 where the exhaust from the manifold of the engine enters a plenum chamber adjacent to the diamond shaped heat exchanger having the basic structure shown in FIG. 1. Direction of the flow of the gases through the bed is transverse to the long dimension of the overall beds. The exhaust gases are collected in a second plenum chamber and are removed at 7 to be recycled through the second bed, re-entering in the direction shown at 6. This removal of the gases at 7 and re-entry to the muffler at 6, for example, would allow the use of a large finned pipe for cooling the gases before they re-enter at 6. The gases, on re-entry, travel at right angles to the gas travel in the first pass through the muffler as shown in the diagram. After having passed through the catalyst bed, they are exhausted to the atmosphere at 8.

Although the process of our invention is shown with the use of a corrugated box-type heat exchanger, other types of heat exchangers would work equally well.

Examples of other types of equipment which could be used in the process of our invention are shown in FIGURES 3 and 4. FIGURE 3 shows a type of arrangement in which the tubes 9 would be filled with the catalyst and the open area 10 would be filled with the lead adsorbent or would act as the first catalyst bed. The gases from the auto exhaust would pass through the area 10 between the tubes and give up their heat through the tubes to heat the catalyst. The gases would then be removed, cooled, and re-circulated through the tubes 9. After exit from the tubes 9 the gases would be collected and passed to the atmosphere. This type of structure would allow the use of a large or a small pipe for cooling the gases after they left the chamber 10 and before being passed through the tubes 9.

FIGURE 4 shows still another type of a structure which would be useful in the process of our invention. In this system the exhaust gases would pass from the manifold to the chamber 10 and would thence move through the tubes 11 which would be filled with either a lead adsorbent or would act as the first catalyst bed. The gases would be collected in the chamber 14 and thus be forced back through the beds 12 which would be filled with catalyst. The gases then would pass to the atmosphere through the area 15 which would be a manifold connection, connecting each of the beds 12. This system would be used where the amount of cooling would not need to be large. The whole funtcion of cooling the exhaust gases between passage through the beds would be taken care of by the plenum chamber 14.

Our invention is further illustrated by the following specific, but non-limiting examples.

EXAMPLE I

Figure 5:
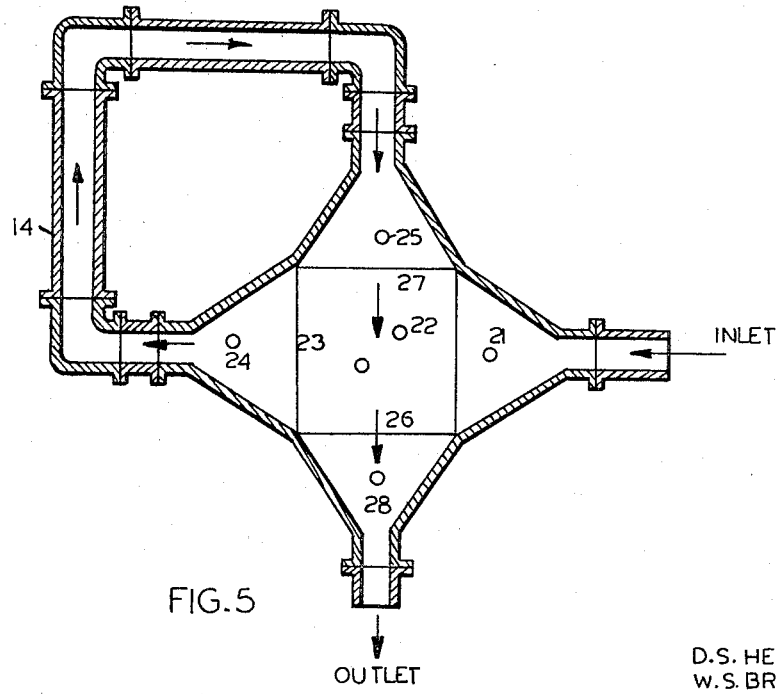

The operation of the method of our invention was demonstrated in a device of the type shown in FIGURE 5. The internal structure of the device was the same as that in FIGURE 1. The device was loaded with alternate layers of lead adsorbent material and a catalyst for conversion of auto exhaust. The temperature of the gases and temperatures in the bed were measured using a series of thermocouples. In operation, the exhaust gases from a single cylinder engine were passed into the inlet of the device, through the lead-adsorbent bed, were circulated around the device through the loop 14 and were brought back into the second bed of the device and passed to the atmosphere through the outlet. The thermocouple wells were placed at points 21 through 28. The thermocouple at point 21 measured the inlet temperature to the inlet adsorbent bed. The thermocouples situated at points 22 and 27 were quite close together but in different beds. That is, one of these thermocouples was in the lead adsorbent bed and the other in the catalyst bed. Similarly, thermocouples 23 and 26 were adjacent but in different beds. The thermocouples at 22, 23, 26 and 27 were inserted about one-third of the distance inside each of the catalyst beds. Temperature was measured at point 24 as it left the lead adsorbent and at point 25 as it entered the catalyst bed, and was again measured at point 28 as it left the catalyst bed.

The device was attached to a single cylinder engine. The engine was operated at conditions of continuous idle (500 r.p.m.), continuous cruise (1800 r.p.m.) and a cyclic operation consisting alternately of thirty seconds at idle and ninety seconds at cruise. Air was passed through the muffler at a rate of 1.5 standard cubic feet per minute. The muffler was loaded with a 10% copper oxide, 0.06% palladium and 4% chromia catalyst supported on nodules of alumina in the catalyst bed and alumina nodules in the lead adsorbent bed. The data collected are shown in Table I below.

of our invention was demonstrated in a run in which the temperature profiles in a standard muffler were measured. The muffler used in this run had the same catalyst volume as the muffler used in collecting the data in Example I. The muffler was divided into a lead adsorbent bed and a catalyst bed. The muffler was loaded with a catalyst containing 10% copper oxide, 0.06% palladium and 4% chomia, on 8 to 10 mesh alumina nodules as in Example I. The temperature was measured at three points. The first point was ½ inch inside the first bed, the lead adsorbent bed. The second point was ½ inch inside the catalyst bed, and the third point was the point of highest temperature in the bed. The data collected in this run is shown in the table below.

*Table II*

| Temperature in °F. at Point No. | Time In Hours | | | | | | | | | |
|---|---|---|---|---|---|---|---|---|---|---|
| | 10 | 20 | 30 | 40 | 60 | 80 | 100 | 120 | 140 | 150 |
| 1 | 740 | 720 | 725 | 700 | 690 | 650 | 800 | 810 | 815 | 810 |
| 2 | 805 | 780 | 775 | 810 | 805 | 680 | 910 | 970 | 920 | 900 |
| 3 | 1,180 | 1,160 | 1,460 | 1,400 | 1,310 | 1,000 | 1,300 | 1,500 | 1,510 | 1,400 |

The advantage of our process is shown by a comparison of the temperatures at point 3 in this run with the

*Table I*

MODE OF OPERATION WITH TIME

| Thermo-couple Number | Cycle 6.4 hours | Cycle 8 hours | Cycle 35.5 hours | Cycle 37 hours | Cycle 87 hours | Continuous idle 187 hours | Continuous cruise 190 hours |
|---|---|---|---|---|---|---|---|
| | Average Temperature In °F. | | | | | | |
| 21 | 667 | 820 | 895 | 930 | 880 | 570 | 1,005 |
| 22 | 889 | 903 | 998 | 960 | 1,025 | 898 | 1,050 |
| 23 | 1,155 | 1,047 | 1,202 | 1,030 | 1,300 | 1,268 | 1,115 |
| 24 | 991 | 875 | 942 | 840 | 1,050 | 975 | 920 |
| 25 | 569 | 488 | 533 | 480 | 685 | 600 | 640 |
| 26 | 1,283 | 1,140 | 1,280 | 1,095 | 1,340 | 1,300 | 1,085 |
| 27 | 1,060 | 1,003 | 1,120 | 1,020 | 1,177 | 1,010 | 1,080 |
| 28 | 920 | 850 | 950 | 893 | 1,025 | 882 | 1,015 |

These data clearly illustrate the advantages of operating a catalytic muffler according to our process. The temperature in the catalyst bed where the conversion takes place was maintained well below temperatures where any possibility of damage to the catalyst would result. The magnitude of the cooling which resulted from the cooling loop which was installed in accordance with the drawing is shown by a comparison of the temperatures at point 21 with the temperatures at point 25. The gases were cooled appreciably by passage through this external loop. The temperatures at points 26 and 27 show the result of the heat exchange from the inlet cycle to the cycle where the gas is passed through the catalyst. The temperature at these points was maintained at a a point high enough to give good conversion but low enough to prevent excessive heat build-up which would cause disintegration of the catalyst.

EXAMPLE II

The advantage of operating according to the process temperature at points 26 and 27 in Table I. The temperatures in the device using the process of our invention are consistently much lower. The possibility of catalyst damage is essentially non-existent in the process of our invention. However, as shown by the temperatures at point 3 in the conventional muffler, the temperatures frequently rise to on the order of 1500° F. which is the temperature which can cause some catalyst disintegration.

EXAMPLE III

The effectiveness of the process of our invention in the conversion of hydrocarbons and carbon monoxide was checked by continuous sampling of the exhaust gases as they left the device described in detail in Example I, and an analysis of these gases was made. The percentage hydrocarbon conversion and carbon monoxide as a function of time is shown in Table III.

*Table III*

| Composition of inlet gases | Time In Hours | | | | | | | | | | |
|---|---|---|---|---|---|---|---|---|---|---|---|
| | 10 | 20 | 40 | 60 | 80 | 100 | 120 | 140 | 160 | 180 | 200 |
| Carbon monoxide (percent) | 3 | 3.4 | 2.6 | 2.5 | 2.5 | 2.6 | 2.4 | 2.8 | 2.8 | 4.0 | 2.6 |
| Hydrocarbons (parts per million) Hexane | 170 | 270 | 270 | 220 | 230 | 180 | 170 | 500 | 580 | 570 | 340 |
| Percent Conversion: Carbon monoxide | 86 | 83 | 85 | 79 | 80 | 76 | 75 | 73 | 76 | 80 | 72 |
| Hydrocarbons | 80 | 71 | 69 | 69 | 70 | 68 | 65 | 68 | 70 | 73 | 65 |

It is apparent from a review of these data that a substantial percentage of the carbon monoxide and hydrocarbons are converted using the process of our invention. Conversions of this magnitude are sufficient to effect removal of noxious entities and to prevent smog formation from the auto exhaust components.

EXAMPLE IV

The superiority of the process of our invention was shown by comparing the residual activities of the used catalysts from the run of Example I, which embodies the principles of the process of our invention, and from the run of Example II, which used a standard catalytic converter. The converter of Example I was kept on stream for 220 hours before sampling the catalyst while samples were taken from the standard converter of Example II after 156 and 220 hours of operation. Activity data were determined in a laboratory test unit at gaseous hourly space velocities of 5400 and 10,800 over a temperature range from 350–850° F. The per cent conversion of carbon monoxide and hydrocarbons at an average catalyst temperature of 800° F. are shown in Table IV below.

*Table IV*

PERCENT CONVERSION AT 800° F. AND GASEOUS HOURLY SPACE VELOCITY OF 5,400 VOLUMES OF GAS PER VOLUME OF CATALYST PER HOUR

| Reactor of Example I after 220 hours | | Reactor of Example II after 156 hours | |
|---|---|---|---|
| Carbon Monoxide | Hydrocarbons | Carbon Monoxide | Hydrocarbons |
| 100 | 69 | 91 | 37 |

PERCENT CONVERSION AT 800° F. AND GASEOUS HOURLY SPACE VELOCITY OF 10,800 VOLUMES OF GAS PER VOLUME OF CATALYST PER HOUR

| After 220 hours | | After 220 hours | |
|---|---|---|---|
| 96 | 35 | 57 | 3 |

This data shows conclusively that the operation of a catalytic system according to the process of our invention results in a conversion substantially higher after 220 hours of operation than the standard catalytic conversion system after 156 hours. This is because the catalyst is protected from the variations in temperature which tend to cause degradation of the catalyst.

The catalyst, the lead adsorbent and the other factors were the same in each of these runs.

Obviously many modifications and variations of the invention, as herein above set forth, may be made without departing from the essence and scope thereof, and only such limitations should be applied, as indicated in the appended claims.

What is claimed:
1. A process for controlling the temperatures in a catalytic system for converting the carbon monoxide and hydrocarbons in the exhaust gases of an internal combustion engine to innocuous entities which comprises passing said exhaust gases, mixed with air, through a bed of a lead adsorbent material contained in a series of metallic corrugated plates in heat exchange relationship with a bed containing a catalyst active for conversion of hydrocarbons and carbon monoxide to innocuous entities further substantially cooling the gases externally to the catalyst bed, passing the cooled gases through said preheated catalyst bed also disposed on corrugated metallic plates and exhausting the purified gases to the atmosphere.

2. A process for preventing overheating of the catalyst in a catalytic system for converting the carbon monoxide and hydrocarbons in the exhaust of an internal combustion engine to innocuous entities which comprises passing said exhaust gases, mixed with air, through a bed of a lead adsorbent material on a nodular support disposed in a series of corrugated metallic plates in such a manner that each nodule is in close proximity to a metallic wall, thus effecting maximum heat exchange, further substantially cooling the gases externally to the catalyst bed and passing the cooled gases through a bed of a catalyst active for converting carbon monoxide and hydrocarbons on a nodular support disposed on corrugated metallic plates in the same manner and in heat exchange relationship with the lead adsorbent bed, collecting the gases emerging from the catalyst bed and releasing said gases to the atmosphere.

3. A process according to claim 2 wherein the catalyst bed contains a catalyst comprising about 10% copper oxide, 0.06% palladium and 4% chromia on nodules of gamma type alumina.

4. A process according to claim 2 wherein the lead adsorbent bed contains nodules of gamma type alumina.

References Cited by the Examiner

UNITED STATES PATENTS

| 3,025,133 | 3/1962 | Robinson et al. | 23—2.2 |
| 3,067,022 | 12/1962 | Reid | 23—2.2 |
| 3,088,271 | 5/1963 | Smith | 23—288.3 |
| 3,224,842 | 12/1965 | Manske | 23—2 X |

OSCAR R. VERTIZ, *Primary Examiner.*

MAURICE A. BRINDISI, *Examiner.*

E. C. THOMAS, *Assistant Examiner.*